US011206262B2

(12) United States Patent
Gargaro et al.

(10) Patent No.: US 11,206,262 B2
(45) Date of Patent: Dec. 21, 2021

(54) POLICY-BASED TRIGGERING OF REVISION OF ACCESS CONTROL INFORMATION

(71) Applicant: INTERNATIONAL BUSINESS MACHINES CORPORATION, Armonk, NY (US)

(72) Inventors: Gianluca Gargaro, Rome (IT); Luigi Lombardi, Naples (IT); Davide Fazzone, Baiano (IT); Raffaele Giulio Sperandeo, Marcianise (IT)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/438,633

(22) Filed: Jun. 12, 2019

(65) Prior Publication Data
US 2020/0396222 A1    Dec. 17, 2020

(51) Int. Cl.
*H04L 29/06* (2006.01)
(52) U.S. Cl.
CPC .............. *H04L 63/10* (2013.01); *H04L 63/20* (2013.01); *H04L 63/101* (2013.01)
(58) Field of Classification Search
CPC ....... H04L 63/10; H04L 63/20; H04L 63/101; G06F 21/604; H04W 12/08
USPC .......................................................... 726/1
See application file for complete search history.

(56) References Cited

U.S. PATENT DOCUMENTS

| | | | |
|---|---|---|---|
| 9,137,263 B2 | 9/2015 | Chari | |
| 9,137,265 B2 | 9/2015 | Chari | |
| 9,154,507 B2 | 10/2015 | Ashley | |
| 9,584,525 B2 | 2/2017 | Baikalov | |
| 10,021,138 B2 | 7/2018 | Gill | |
| 10,139,789 B2* | 11/2018 | Soni | ........................ H04L 63/10 |
| 2004/0205342 A1 | 10/2004 | Roegner | |
| 2011/0126111 A1 | 5/2011 | Gill | |
| 2012/0246098 A1 | 9/2012 | Chari | |
| 2013/0111583 A1 | 5/2013 | Hernandez | |
| 2015/0373028 A1 | 12/2015 | Baikalov | |
| 2016/0139573 A1 | 5/2016 | Amit | |

(Continued)

FOREIGN PATENT DOCUMENTS

| | | |
|---|---|---|
| CN | 109165516 A | 1/2019 |
| WO | 2020250103 A1 | 12/2020 |

OTHER PUBLICATIONS

International Search Report and Written Opinion, International Application No. PCT/IB2020/055358, dated Sep. 29, 2020, 7 pages.

(Continued)

*Primary Examiner* — Longbit Chai
(74) *Attorney, Agent, or Firm* — L. Jeffrey Kelly

(57) ABSTRACT

A method, computer program product and a computer system for facilitating a maintenance of access control information for controlling access to one or more resources of an information technology system by one or more subjects. One or more trigger policies are evaluated according to one or more policy parameters relating to the resources, the subjects and/or the access to the resources by the subjects. A revision of the access control information including a mining activity for mapping the subjects to the resources is triggered according to a result of the evaluation of the trigger policies. A computer program and a computer program product for performing the method are also proposed.

20 Claims, 9 Drawing Sheets

(56) References Cited

U.S. PATENT DOCUMENTS

2018/0234428 A1    8/2018  Braksator
2019/0327271 A1   10/2019  Saxena
2020/0076818 A1    3/2020  Krishnan

OTHER PUBLICATIONS

IBM: List of IBM Patents or Patent Applications Treated as Related (Appendix P), Mar. 23, 2021, 2 pages.
Pending U.S. Appl. No. 17/202,442, filed Mar. 16, 2021, entitled: "Revision of Access Control System Triggered by Policies Based on Risks and/or Countermeasures Thereof", 58 pages.
Mell et al., "The NIST Definition of Cloud Computing", National Institute of Standards and Technology, Special Publication 800-145, Sep. 2011, pp. 1-7.
Talukdar et al., "Efficient bottom-up Mining of Attribute Based Access Control Policies", IEEE Conf Collab Internet Comput. Oct. 2017; 2017: 339-348.
Bijon et al., "A Framework for Risk-Aware Role Based Access Control", 6th Symposium on Security Analytics and Automation 2013, pp. 462-469.
Chen et al., "Risk-Aware Role-Based Access Control", STM 2011, LNCS 7170, 2012, pp. 140-156.

\* cited by examiner

POLICY-BASED TRIGGERING OF REVISION OF ACCESS CONTROL INFORMATION

BACKGROUND

The present disclosure relates to the information technology field. More specifically, this disclosure relates to the control of access to information technology systems.

The background of the present disclosure is introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The control of access to information technology systems is a crucial issue for their management. In general terms, this relates to a process used to control activities that may be performed on (protected) resources of an information technology system by different subjects, for example, (human) users. The access control process is aimed at enabling the (right) subjects to perform the (right) activities at right times and for right reasons; this avoids (or at least significantly reduces) the risk that unauthorized subjects might perform undesired (and generally dangerous) activities in the information technology system. This is very important to guarantee data security and regulatory compliance.

SUMMARY

According to a first aspect of the present invention, there is provided a computer implement method, computer program product, computer system, and a control computing system for facilitating a control of access to an information technology system by one or more subjects. The method includes retrieving, by a control computing system, one or more trigger policies each based on one or more state parameters relating to the information technology system, retrieving, by the control computing system, the state parameters, evaluating, by the control computing system, the trigger policies according to the corresponding state parameters, determining, by the control computing system, a trigger indicator according to a result of said evaluating the trigger policies, and outputting, by the control computing system, an indication of the trigger indicator to trigger a revision of access control information for controlling the access to the information technology system according to the trigger indicator.

A simplified summary of the present disclosure is herein presented in order to provide a basic understanding of; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of providing a policy-based triggering of the revision of the access control information.

Particularly, an embodiment provides a method for facilitating a control of access to an information technology system. One or more trigger policies are evaluated according to one or more state parameters relating to the information technology system. A revision of access control information for controlling the access to the information technology system is triggered according to a result of the evaluation of the trigger policies.

A further aspect provides a computer program for implementing the method.

A further aspect provides a corresponding computer program product.

A further aspect provides a corresponding control computing system.

More specifically, one or more aspects of the present disclosure are set out in the independent claims and advantageous features are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
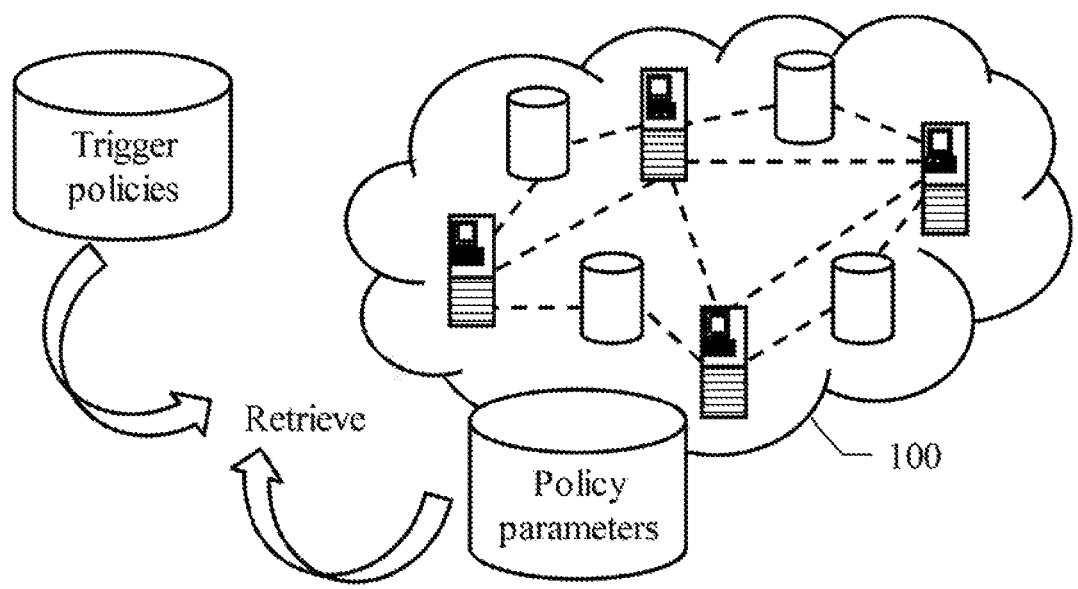
FIGS. 1A-1D depict an example of application of the solution according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the information technology field. More specifically, this disclosure relates to the control of access to information technology systems.

The following described exemplary embodiments provide a system, method, and program product to, among other things, provide a policy-based triggering of the revision of access control information in information technology systems. Therefore, the present embodiment has the capacity to improve the technical field of computing by facilitating a control of access to an information technology system by one or more subjects, or users, or systems.

The access control process is generally implemented by an Identity and Access Management (hereinafter "IAM") application. Briefly, the IAM application allows managing digital identities correlated to the subjects (for example, accounts of the users with their passwords). The IAM application also allows granting specific permissions which authorize each subject to perform specific activities in the information technology system (for example, reading/writing files). The IAM application then allows enforcing the access to the information technology system by the subjects according to their permissions (for example, a subject having a read permission for a file may not update it). Moreover, the IAM application allows monitoring compliance of the access to the information technology system to security policies governing the access control process.

The access control process may be based on different security models. For example, the most common security model is the Role Based Access Control (hereinafter "RBAC") model. In this case, one or more roles are defined, each with one or more permissions (to perform activities in the information technology system). Each subject is assigned one or more roles, and then corresponding permissions. Another promising security model is the Attribute Based Access Control (ABAC) model, also known as Policy Based Access Control (PBAC) or Claims Based Access Control (CBAC). In this case, one or more rules are defined each for a permission based on one or more attributes; each subject is assigned the permissions of the rules which are satisfied by the corresponding attributes. This facilitates the management of the access control process, especially in large organizations (with thousands of subjects and permissions).

However, the access control process is generally subject to dynamic requirements (which change with a relative high frequency); for example, this may be due to reorganization, acquisition and outsourcing operations as well as to regulatory modifications. Therefore, access control information used to control the access to the information technology system is continually revised (in an attempt to keep it up to the actual requirements). Particularly, in case the access control process is based on the RBAC/ABAC model, role/rule mining techniques may be applied to discover typical patterns of subjects to resources mapping, which is used to change roles/rules accordingly. In any case, this role/rule mining activity is time consuming; in any case, it requires a heavy manual intervention. All of the above makes the revision of the access control information quite expensive.

Therefore, the revision of the access control information is generally performed only in response to events that are deemed to involve significant changes; for example, this may be the case of an upheaval in an organizational chart, an incorporation of a new company, a spin-off of a business branch, the creation of a new strategy area and so on.

However, it may happen that despite some events appeared to be valid reasons for revising the access control information, the obtained results did not worth its cost; vice-versa, it may happen that events that appeared not significant instead would have required a heavy change in the access control information. In any case, even minor events which do not involve any significant change individually may do so when occurring continually over a long time.

Therefore, the determination of the right time for revising the access control information is challenging; in any case, this is a completely manual task, which is then strongly depending on personal skills, prone to errors and scarcely reproducible. As a consequence, a risk exists of performing useless revisions of the access control information; this adversely affects a management cost of the information technology system. Conversely, a risk exists of delaying useful revisions of the access control information; this may cause data security and/or regulatory compliance exposures.

A simplified summary of the present disclosure is herein presented in order to provide a basic understanding; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of providing a policy-based triggering of the revision of the access control information.

Particularly, an embodiment provides a method for facilitating a maintenance of access control information for controlling access to one or more resources of an information technology system by one or more subjects. One or more trigger policies are evaluated according to one or more policy parameters relating to the resources, the subjects and/or the access to the resources by the subjects. A revision of the access control information including a mining activity for mapping the subjects to the resources, is triggered according to a result of the evaluation of the trigger policies.

A further aspect provides a computer program for implementing the method.

A further aspect provides a corresponding computer program product.

A further aspect provides a corresponding control computing system.

More specifically, one or more aspects of the present disclosure are set out in the independent claims and advantageous features are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

Referring to FIGS. 1A-1D, an example is shown of application of the solution, according to an embodiment of the present disclosure.

As shown in FIG. 1A, an access control process is implemented to control access to an information technology system 100. Particularly, activities that may be performed on one or more resources of the information technology system 100 by different subjects, for example, (human) users are controlled according to corresponding access control information. For example, in case the access control process is based on the RBAC model, the access control information indicates roles having permissions for performing activities and their assignment to the subjects, where in case the access control process is based on the ABAC model, the access control information indicate rules defining permissions to perform activities by the subjects when satisfied by corresponding attributes.

In a solution according to an embodiment of the present disclosure, one or more trigger policies are provided for determining when a revision of the access control information is needed. Each trigger policy is based on one or more policy parameters that relate to the resources, the subjects and/or the access to the resources by the subjects (for example, number of new ones of them). Over time, for example, periodically, the trigger policies and their policy parameters are retrieved.

Figure 1B:
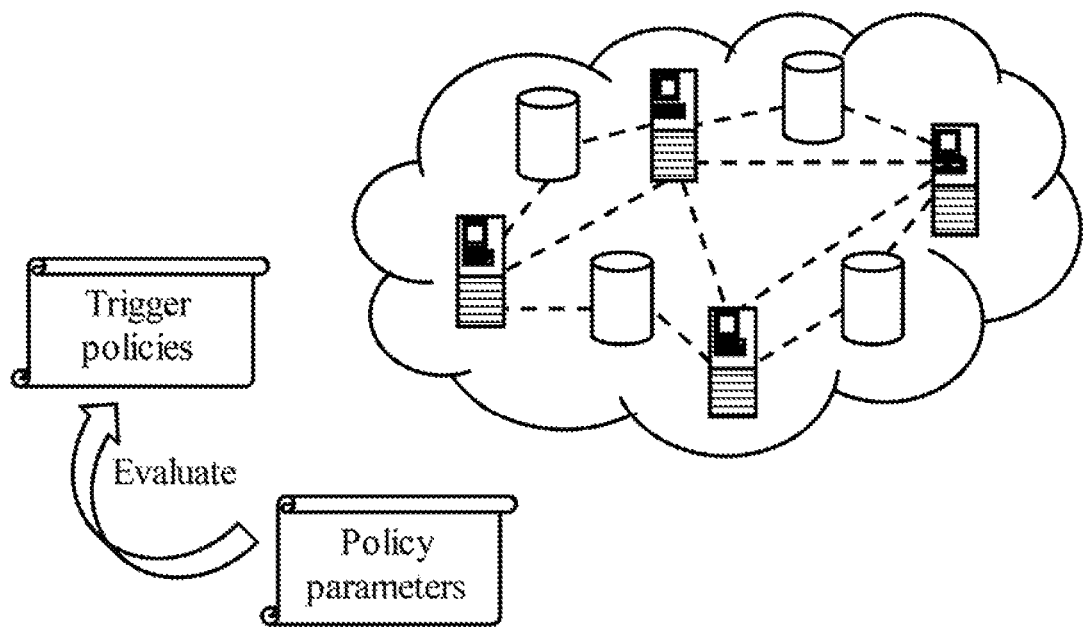

As shown in FIG. 1B, the trigger policies are evaluated according to the corresponding policy parameters; for example, each trigger policy is evaluated by determining whether it is true or false.

Figure 1C:
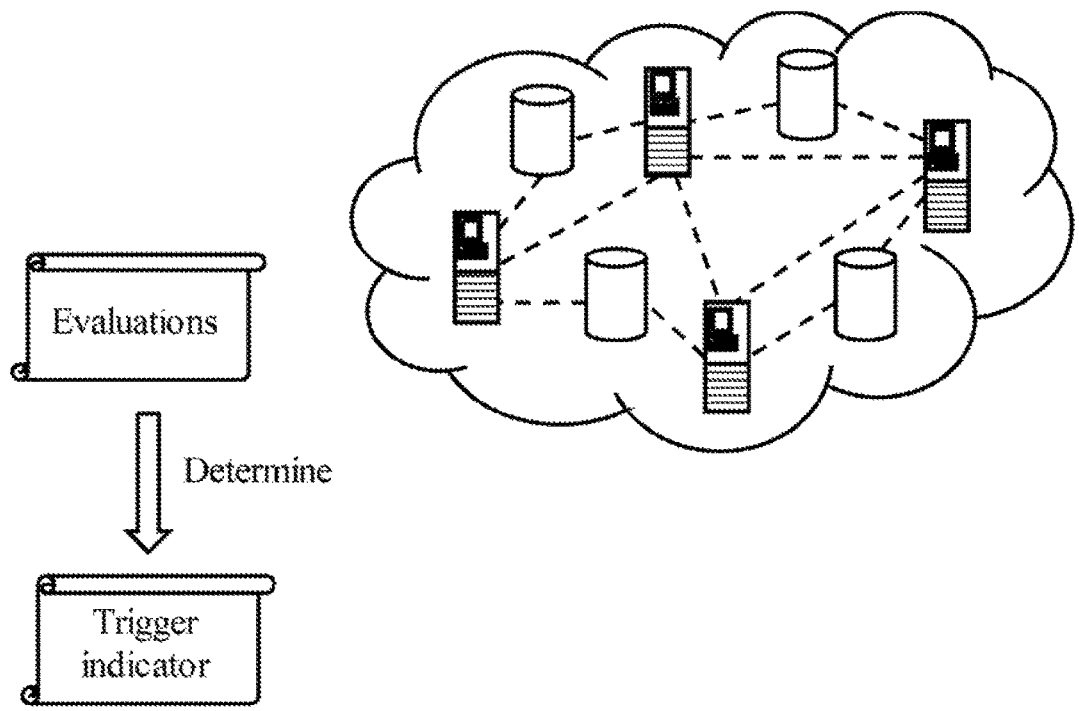

As shown in FIG. 1C, a trigger indicator is determined according to the evaluations of the trigger policies; for example, the trigger indicator is a trigger index that is calculated by weighting the trigger policies that are true according to corresponding scores (depending on their effectiveness in triggering the revision of the access control information).

Figure 1D:
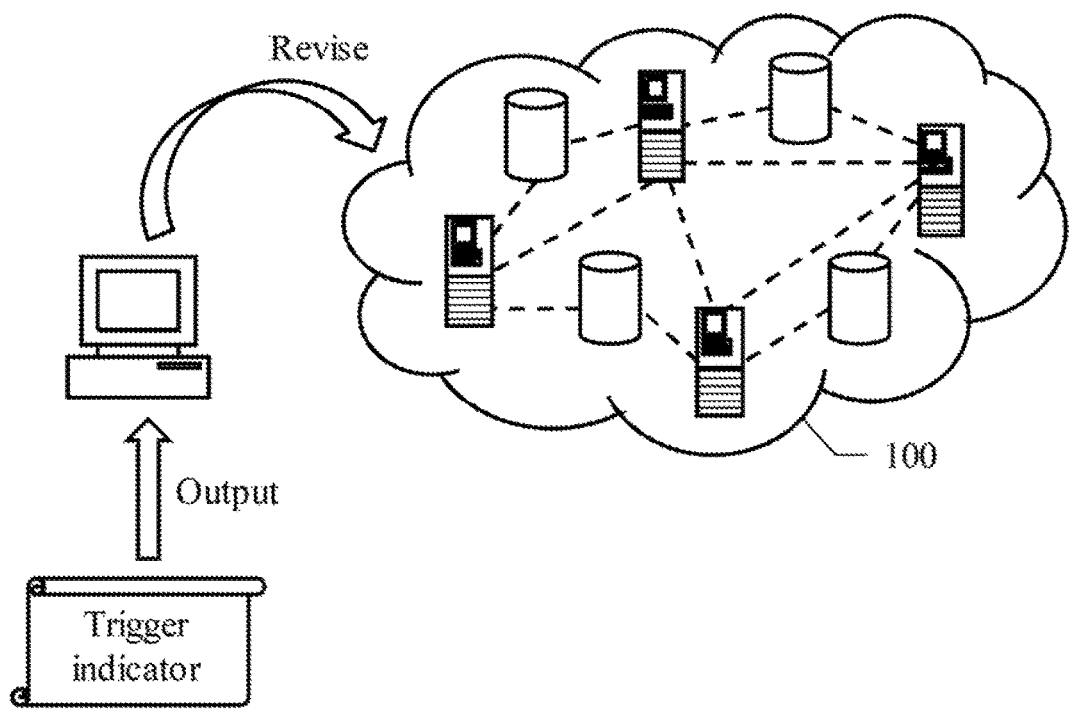

As shown in FIG. 1D, the trigger indicator is output (for example, displayed) so as to cause the revision of the access control information in response (for example, when the trigger index exceeds a threshold), particularly, this involves a mining activity for mapping the subjects to the resources (for example, a role mining for the RBAC model and a rule mining for the ABAC model) and a possible update of the access control information based on a result of the mining activity.

The above-described solution facilitates determining the right time for revising the access control information; for example, it is now possible to ascertain whether the revision of the access control information is needed, i.e., appropriate, useful or necessary. This result is achieved in a substantial automatic way, so that it is highly accurate, reliable and reproducible. As a consequence, there is avoided (or at least substantially reduced) the risk of performing useless revisions of the access control information; this has a beneficial effect on a management cost of the information technology system 100. Conversely, there is avoided (or at least substantially reduced) the risk of delaying useful revisions of the access control information; this prevents data security and/or regulatory compliance exposures.

Figure 2:
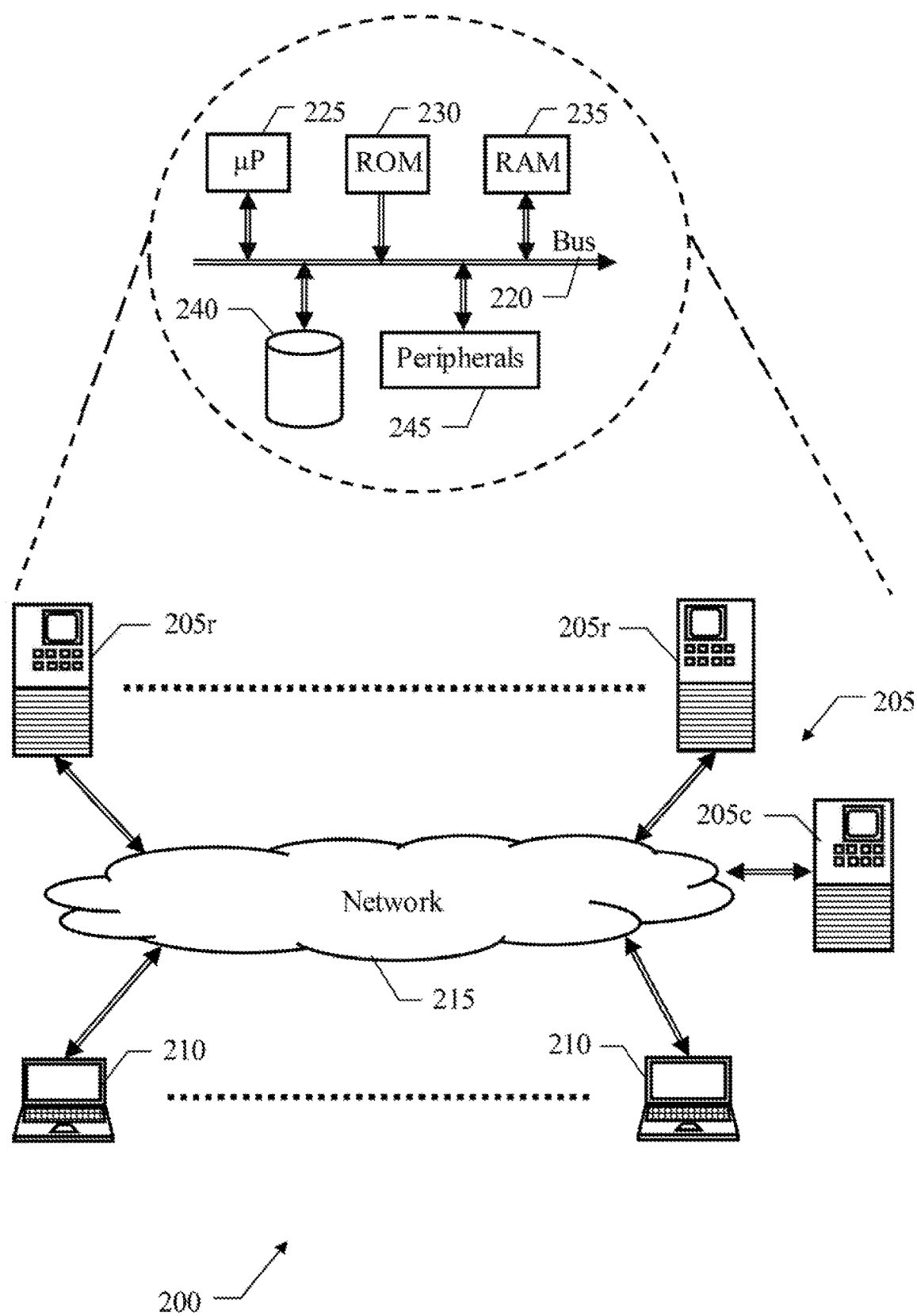
FIG. 2 depicts a schematic block diagram of an information technology infrastructure wherein the solution according to an embodiment of the present disclosure may be practiced.

Referring to FIG. 2, a schematic block diagram is shown of an information technology infrastructure 200 where the solution according to an embodiment of the present disclosure may be practiced.

The information technology infrastructure 200 has a distributed architecture based on a client/server model. Particularly, one or more server computing machines, or simply servers 205 provide services to one or more client computing machines, or simply clients 210. For this purpose, the clients 210 communicate with the servers 205 over a (communication) network 215 (for example, based on the Internet). One or more of the servers 205 are resource servers, differentiated with the reference 205r, which implement the above-mentioned information technology system whose access has to be protected; the resource servers 205r (for example, providing services like customer relationship management (CRM), lightweight directory access protocol (LDAP), security information and event management (SIEM), Software as a Service (SaaS), e-mail and so on) have hardware and/or software resources (for example, devices, machines, files, programs, web pages and so on) that may be accessed only by (authorized) users of the clients 210. One of the servers 205 (or more) is a control server, differentiated with the reference 205c, which controls the access to the resources of the resource servers 205r by the users of the clients 210 (for example, to use devices, start/stop machines, read/write files, run programs, download web pages and so on).

Each one of the above-described computing machines (i.e., servers 205 and clients 210) includes several units that are connected among them through a bus structure 220 with one or more levels (with an architecture that is suitably scaled according to the type of the computing machine 205, 210). Particularly, one or more microprocessors (µP) 225 control operation of the computing machine 205,210; a non-volatile memory (ROM) 230 stores basic code for a bootstrap of the computing machine 205,210 and a volatile memory (RAM) 235 is used as a working memory by the microprocessors 225. The computing machine 205, 210 is provided with a mass-memory 240 for storing programs and data (for example, storage devices of data centers wherein the servers 205 are implemented and hard disks for the clients 210). Moreover, the computing machine 205, 210 includes a number of controllers for peripherals, or Input/Output (I/O) units, 245; for example, the peripherals 245 of each server 205 comprise a network card for plugging the server 205 into the corresponding data center and then connecting it to a console of the data center for its control (for example, a personal computer, also provided with a drive for reading/writing removable storage units, such as optical disks like DVDs) and to a switch/router sub-system of the data center for its communication with the network 215, whereas the peripherals 245 of each client 210 comprise a keyboard, a mouse, a monitor, a network adapter (NIC) for connecting to the network 215 and a drive for reading/writing removable storage units.

Figure 3:
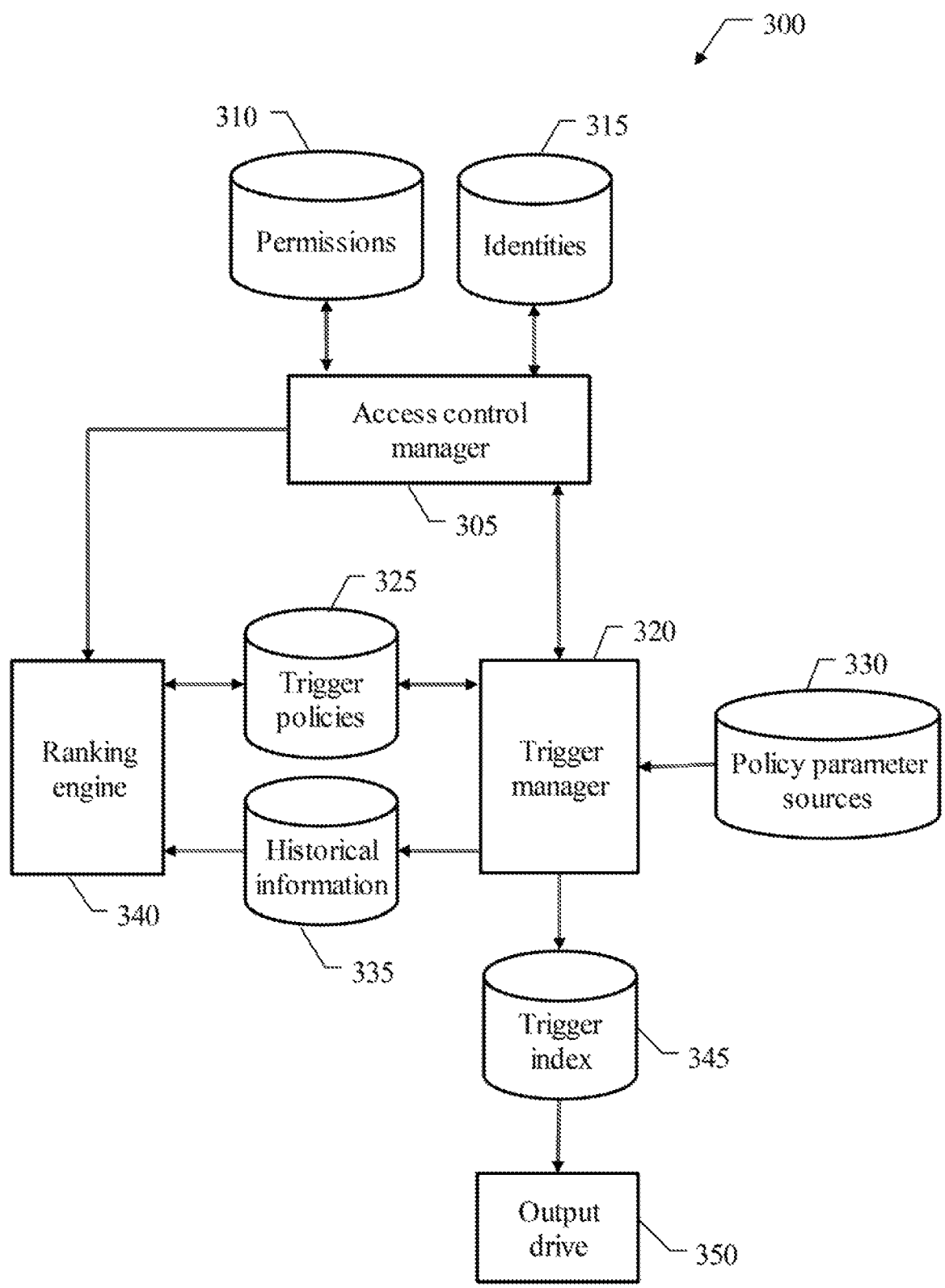
FIG. 3 depicts the main software components that may be used to implement the solution according to an embodiment of the present disclosure.

Referring to FIG. 3, the main software components are shown that may be used to implement a solution according to an embodiment of the present disclosure.

Particularly, all the software components (programs and data) are denoted as a whole with the reference 300. The software components 300 are typically stored in the mass memory and loaded (at least in part) into the working memory of the control server when the programs are running. The programs are initially installed into the mass memory, for example, from removable storage units or from the network (not shown in the figure). In this respect, each program may be a module, segment or portion of code, which includes one or more executable instructions for implementing the specified logical function.

An access control manager 305 controls the access to the information technology system from the clients (not shown in the figure). The access control manager 305 runs in the background as a service; the access control manager 305 intercepts any request for performing a selected activity (on a corresponding resource of the information technology system) from a client and allows or prevents it according to authorizations granted to a corresponding subject (for example, a user logged in the client). The access control manager 305 accesses (in read/write mode) a permission database 310 and an identity database 315, which store the access control information used to control the access to the information technology system. Particularly, when the access control manager 305 is based on the RBAC model, the permission database 310 has an entry for each role (identified by a corresponding unique identifier); the entry indicates one or more permissions assigned to the role for performing one or more activities (for example, a developer is authorized to read/write projects on which s/he is working, a team leader is authorized to read/write all the projects of the developers of his/her team, a manager is authorized to read all the projects of the developers reporting thereto and so on).

The identity database 315 has an entry for each user which is registered with the access control manager 305 (identified by a corresponding unique identifier); the entry indicates an account and password of the user, and one or more roles assigned to the user. Alternatively, when the access control manager 305 is based on the ABAC model the permission database 310 has an entry for each rule. The entry indicates a permission which is granted or refused for performing an activity (or more) when the rule is satisfied. The rule is based on one or more attributes; the attributes may relate to the resources (for example, their type, location, classification and so on), to the users (for example, responsibilities, duties, competences, department and so on), to the activities (for example, read, write, delete, approve and so on) and/or to a context (for example, date, time and so on). For example, the rules may indicate that an employee is authorized to update a report when s/he is in a specific location, a developer is authorized to update a program when it is in a test mode, no user is authorized to read a document before a certain date, and so on. The identity database 315 has an entry for each user which is registered with the access control manager 305; the entry indicates the account/password of the user, and one or more attributes thereof. A commercial example of the access control manager 305 is "IBM Security Identity and Access Manager" by IBM Corporation. IBM is a registered trademark of International Business Machines Corporation.

In a solution according to an embodiment of the present disclosure, a trigger manager 320 triggers the revision of the access control information. The trigger manager 320 interacts with the access control manager 305. The trigger manager 320 accesses (in read/write mode) a trigger policy repository 325 (for example, populated manually by a system administrator through a user interface of the trigger manager 320). The trigger policy repository 325 has an entry for each trigger policy (identified by a corresponding unique identifier); the entry indicates the trigger policy and the corresponding score. The trigger policy is defined by a logic expression producing a logic value (true or false); the logic expression includes one or more conditions (each producing a logic value according to one or more policy parameters) which may be combined with logic operators (such as AND, OR, NOT and so on). The policy parameters are macro indicators relating to a condition of the whole information technology system, or a relevant part thereof (i.e., not at the level of single resources/users); particularly, the policy parameters may relate to the resources (for example, number of new resources, number of new resources in a specific location and so on), to the users (for example, number of new users, number of new users in a department, number of changes in an organizational chart and so on) and/or to the access to the resources by the users (for example, number of new roles/rules, number of new users corresponding to the roles/rules, number of new permissions in the roles/rules, number of new attributes in the rules and so on).

A simple example of trigger policy may be:

$TP1=(Nu>THu)$ AND $(Na>THa)$, where Nu is the number of new users added to the identity database since a last evaluation of the trigger policy, THu is a corresponding threshold, Na is the number of new accounts added to the human resource database since the last evaluation of the trigger policy, THa is a corresponding threshold and TP1 is the logic value of the trigger policy. The trigger policy may also be conditioned by one or more evaluation conditions, which are to be satisfied before the (conditioned) trigger policy may be evaluated. Each evaluation condition is based on the completion of a conditioning task (such as verifying information by a manager, reaching a certain degree of progress of a project and so on). In turn, the evaluation condition may depend on a logic expression (either part of the one defining the logic value of the trigger policy or independent therefrom), such as in the form of an IF/THEN construct.

Other examples of trigger policies with simple evaluation conditions may be:

$TP2=(Nr>THr)|EV$, $TP3=(Nr>THr)|IF(TP3)$ then $EV$, $TP4=(Nr>THr)|IF(Np>THp)$ then $EV$, where Nr is the number of roles assigned to the users of a specific department, THr is a corresponding threshold, Np is the number of permissions of the roles assigned to the department, THp is a corresponding threshold, EV is a verification of the roles assigned to the department by a manager and TP2, TP3 and TP2 are the logic values of the trigger policies. Therefore, in the first case the task EV is performed and, once it has been completed, the logic expression (Nr>THr) is evaluated to determine the logic value TP2 of the trigger policy, in the second case if the logic expression (Nr>THr) defining the trigger policy TP3 is true the task EV is performed and, once it has been completed, the logic expression (Nr>THr) is evaluated again to determine the logic value TP3 of the trigger policy, and in the third case if the logic expression (Np>THp) is true the task EV is performed and, once it has been completed, the logic expression (Nr>THr) is evaluated to determine the logic value TP4 of the trigger policy. The score of the trigger policy is a number (for example, from 0 to 1), with the higher the effectiveness of the trigger policy in triggering the revision of the access control information the higher its score. Moreover, the trigger manager 320 accesses (in read mode) one or more policy parameter sources 330. The policy parameter sources 330 are entities (such as memory structures, services, applications and so on) providing the values of the policy parameters; for example, the policy parameter sources 330 comprise the permission database 310, the identity database 315, an inventory database of the information technology system, a human resource database of an organization associated with the information technology system, and so on.

The trigger manager 320 accesses (in write mode) a historical information database 335. The historical information database 335 has an entry for each revision of the access control information that has been triggered by the above-mentioned solution, for example, in the last 1-5 years. The entry indicates the (relevant) trigger policies that have been evaluated to true, meaning that they have contributed to trigger the revision of the access control information; moreover, the entry indicates a change of the access control information resulting from its revision (for example, the roles/tules that have been created, updated or deleted, the permissions that have been added, altered or removed for each updated role/rule, the roles that have been added or removed for each user, the attributes that have been added or removed for each role/user, and so on). A ranking engine 340 updates the scores of the policies with a feedback mechanism. For this purpose, the ranking engine 340 accesses (in read mode) the historical database 335, interacts with the access control manager 305 and accesses (in read/write mode) the trigger policy database 325.

The trigger manager 320 accesses (in write mode) a trigger index table 345, which stores (a last value of) the trigger index. An output drive 350 outputs an indication of the trigger index, for example, by interacting with a monitor drive, an e-mail client, the access control manager 305 and so on. The output drive 350 accesses (in read mode) the trigger index table 345.

Figure 4A:
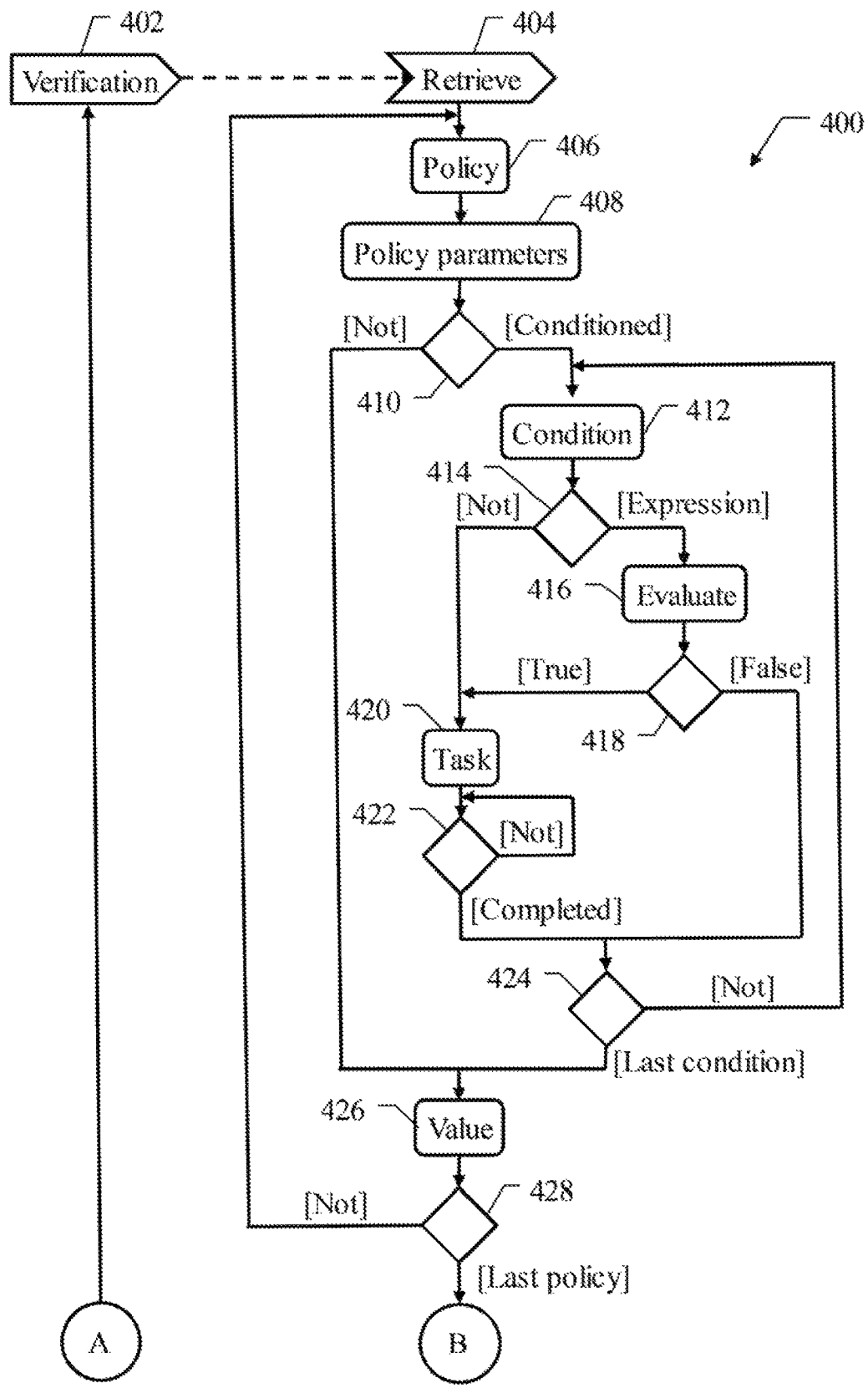
FIGS. 4A-4c show an activity diagram describing the flow of activities relating to an implementation of the solution according to an embodiment of the present disclosure.
Figure 4B:
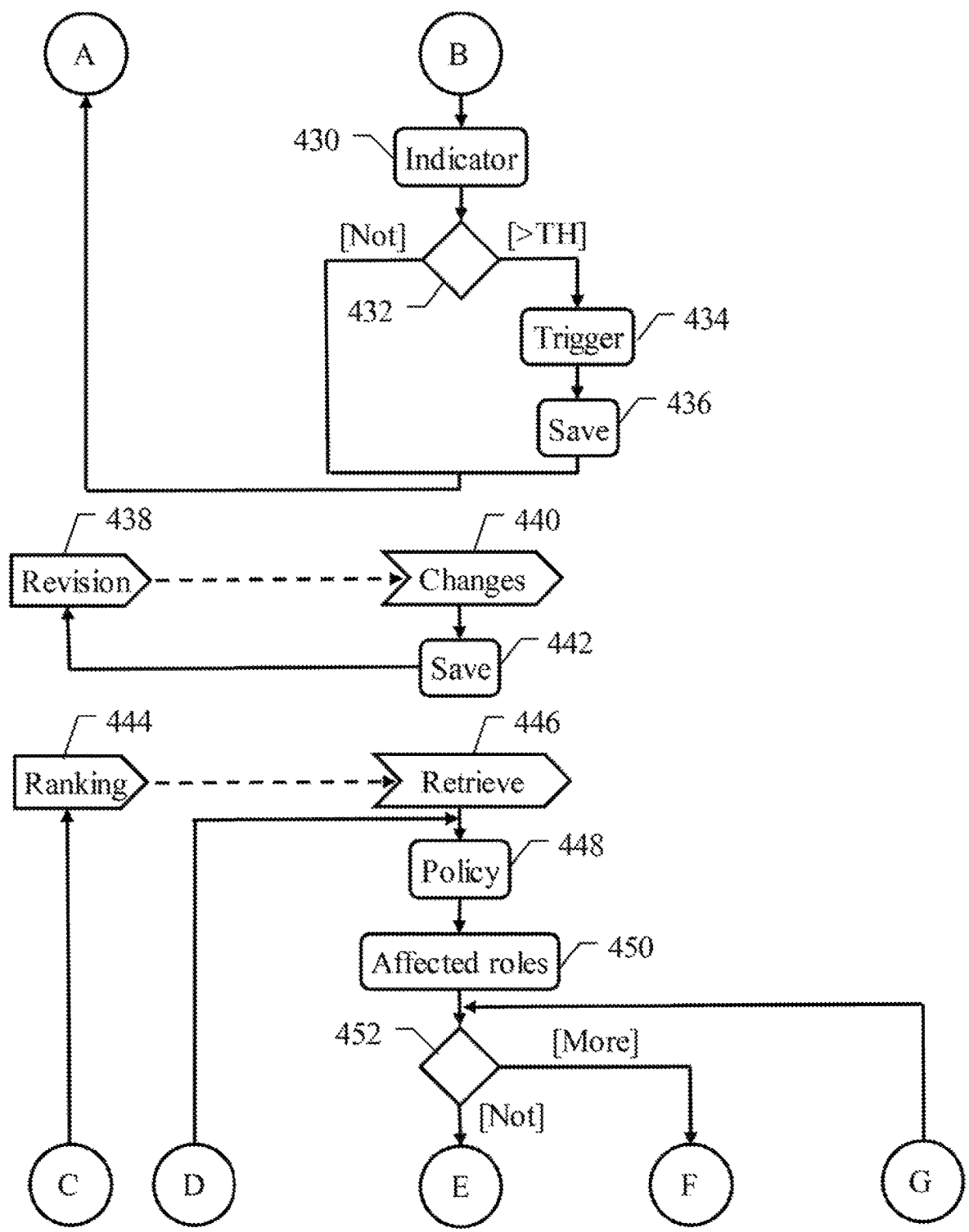
Figure 4C:
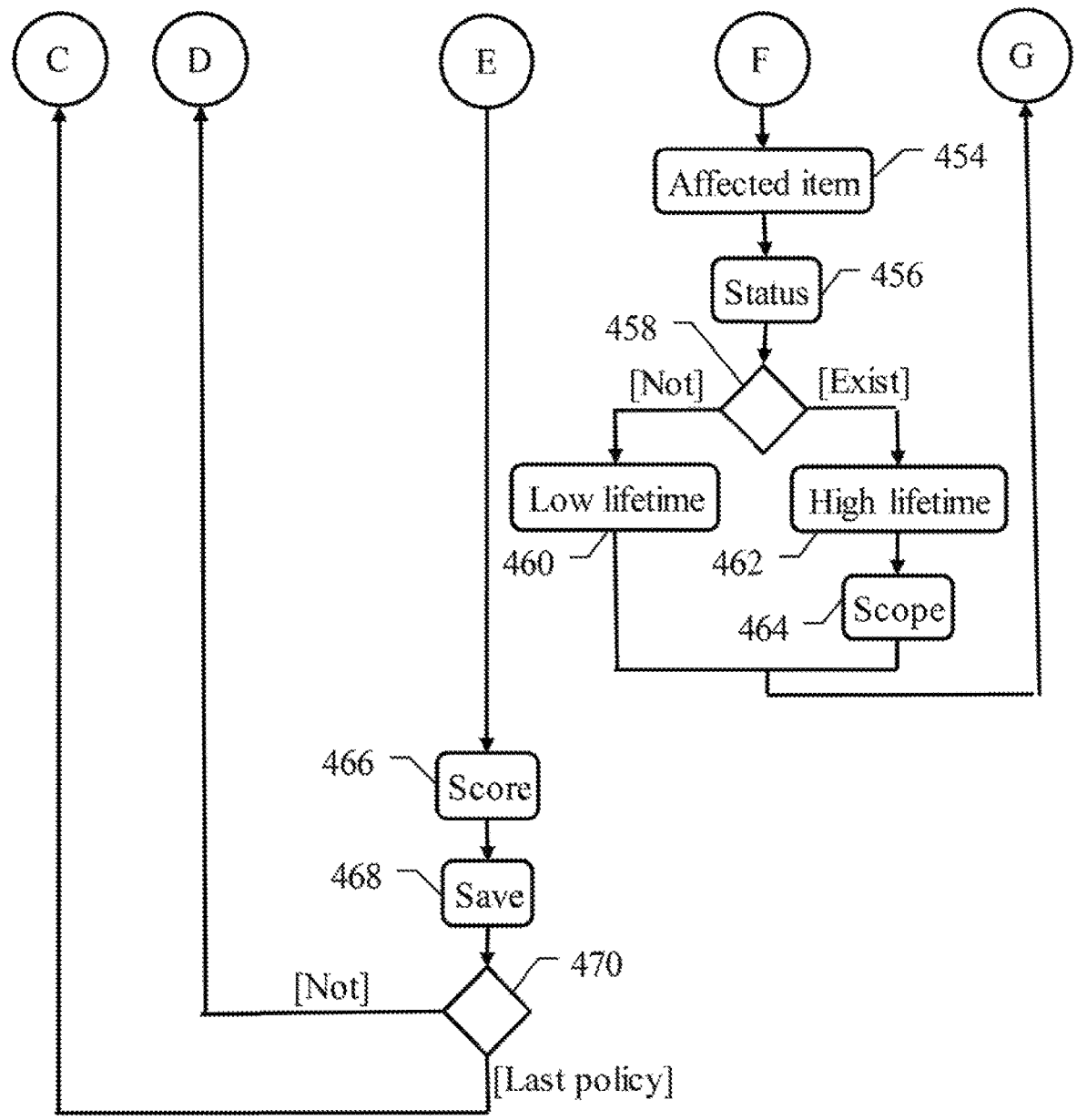

Referring to FIGS. 4A-4C, an activity diagram is shown describing the flow of activities relating to an implementation of the solution according to an embodiment of the present disclosure.

Particularly, the activity diagram represents an exemplary process that may be used to trigger the revision of the access control information with a method 400. In this respect, each block may correspond to one or more executable instructions for implementing the specified logical function on the control server.

As shown in FIG. 4A, the process passes from verification at block 402 to retrieval at block 404 when an event occurs starting a verification operation for the need of revising the access control information. For example, this may happen after a significant change of the policy parameters defining the trigger policies (such as the change of more than 10-20%) and/or periodically (for example, every 1-7 days). The trigger manager retrieves, at block 404, the trigger policies and their scores from the corresponding database. A loop is then entered for processing the trigger policies. The loop begins at block 406, wherein the trigger manager takes a (current) trigger policy into account (starting from a first one in any arbitrary order). The trigger manager at block 408 retrieves the policy parameters indicated in the trigger policy; the policy parameters are retrieved from the policy parameter sources, possibly with a cache mechanism.

The flow of activity branches at block 410 according to the type of the trigger policy. If the trigger policy is conditioned, a further loop is entered for processing the evaluation conditions of the (conditioned) trigger policy. The loop begins at block 412, where the trigger manager takes a (current) evaluation condition into account (starting from a first one in the corresponding order indicated in the trigger policy). The flow of activity branches at block 414 according to the type of the evaluation condition. If the evaluation condition depends on a logic expression, the trigger manager at block 416 evaluates it. The flow of activity branches at block 418 according to the logic value produced by the logic expression. If the logic expression has been evaluated to true, the process descends into block 420; the same point is also reached directly from the block 414 if the evaluation condition does not depend on any logic expression. At this point, the execution of the conditioning task is caused (for example, by sending a corresponding notification to a person, a corresponding command to a software application and so on). The trigger manager then enters an idle loop at block 422 waiting for the completion of the conditioning task. As soon as the conditioning task has been completed (for example, as notified by a corresponding message), and in any case after a predefine time-out, the process descends into block 424; the same point is also reached directly from the block 418 if the logic expression has been evaluated to false. The trigger manager now verifies whether a last evaluation condition has been taken into account. If not, the process returns to the block 412 for repeating the same operation on a next evaluation condition of the trigger policy. Conversely, as soon as all the evaluation conditions of the trigger policy have been taken into account, the corresponding loop is exit by descending into block 426; the same point is also reached directly from the block 410 if the trigger policy is not conditioned.

The trigger manager now evaluates the logic expression of the trigger policy to determine its logic value at block 426 (always set to false when any conditioning task of the trigger policy has not been completed for any reason, i.e., false logic expression or time-out expiration), which logic value is saved into a working variable. The trigger manager at block 428 verifies whether a last trigger policy has been processed. If not, the process returns to the block 406 for repeating the same operation on a next trigger policy. Conversely, as soon as all the trigger policies have been processed, the corresponding loop is exit by descending into block 430.

As shown in FIG. 4B, at block 430, the trigger manager determines the trigger index according to the logic values and the scores of the trigger policies (suitably normalized). For example, the trigger index is calculated by applying the following formula:

$$TI = \sum_{i=0}^{TOTp} \frac{Tp_i * R_i}{TOTp}$$

where TOTp is a total number of the trigger policies, $TP_i$ is a numerical value corresponding to the logic value of the i-th trigger policy (retrieved from the corresponding working variable), such as 1 for true and 0 for false, $R_i$ is the score of the i-th trigger policy and TI is the value of the trigger index (similar considerations apply if the trigger index is calculated incrementally during the evaluation of the trigger policies). In this way, the trigger index has a value ranging from 0 to 1. Particularly, only the trigger policies evaluated to true contribute to the trigger index, with the contribution of these trigger policies that is proportional to their score.

The trigger manager at block 432 compares the trigger index with a (trigger) threshold (for example, 0.5-0.7). If the trigger index is (possibly strictly) higher than the trigger threshold, the trigger manager at block 434 outputs an indication to trigger a revision of the access control information; for example, the trigger manager sends a trigger message to the system administrator (such as via e-mail, SMS and so on). The trigger message indicates a need of revising the access control information; the trigger message may also comprise additional information about the reason of doing so, such as the trigger index, the trigger polices with the highest scores that have been evaluated to true, and so on. At the same time, the trigger manager at block 436 adds a new entry to the historical database for this revision of the access control information (for example, identified by a corresponding timestamp); the trigger manager then adds an indication of the trigger policies that have been evaluated to true (and then have contributed to trigger the revision of the access control information) to the new entry. The process now returns to the block 402 (waiting for a next event triggering the verification process) from the block 436 or directly from the block 432 when the trigger index is (possibly strictly) lower than the trigger threshold (and then no revision of the access control information is needed).

Whenever the revision of the access control information has been triggered, the access control manager is in a waiting condition at block 438 for its completion. Particularly, the revision involves a mining activity, wherein a mapping of the users to the resources is discovered according to typical patterns of the users needing to access the resources; for example, the mining activity may be performed with a bottom-up approach, a top-down approach or a by-example approach. One or more changes to be applied to the access control information are then determined according to a result of the mining activity, i.e., the mapping users-to-resources (for example, in the roles and the users assigned to the roles for the RBAC model or in the rules and the attributes of the rules/users for the ABAC model). The permission database and/or the identity database are then updated according to the changes resulting from the mining activity (for example, by adding roles/rules, updating users assigned to roles, updating rules, adding/deleting attributes, deleting roles/rules, and so on). The process passes to block 440 as soon as the trigger manager receives a notification of completion of the revision of the access control information (for example, via a command entered manually by the system administrator). In response thereto, the trigger manager retrieves an indication of the updates that have been applied to the access control information from the permission database and the identity database (through the access control manager). The trigger manager at block 442 saves these updates into the corresponding entry of the historical database. The process then returns to the block 438 waiting for the completion of a next revision of the access control information.

In a completely independent way, the process passes from ranking at block 444 to retrieving at block 446 as soon as a (ranking) period expires for performing a ranking operation of the trigger policies to update their scores (for example, every 7-14 days). In response thereto, the ranking engine retrieves the trigger policies and their scores from the corresponding database. A loop is then entered for processing the trigger policies. The loop begins at block 448, wherein the ranking engine takes a (current) trigger policy into account (starting from a first one in any arbitrary order). The ranking engine at block 450 retrieves (from the historical database) an indication of the affected control items, if any, which have been affected by the trigger policy; the affected control items are the roles/rules that have been created a and/or updated during every revision of the access control information for which the (relevant) trigger policy has contributed to trigger its revision (i.e., it has been evaluated to true).

A further loop is entered for processing the affected control items of the trigger policy. The loop begins at block 452, where the ranking engine verifies whether any more affected control item remains to be processed. If so the ranking engine at block 454 takes a (current) affected control item still to be processed into account (starting from a first one in any arbitrary order). The raking engine at block 456 retrieves (from the permission database through the access control manager) a life status of the affected control item. The flow of activity branches at block 458 according to this life status. If the affected control item does not exist any longer, the ranking engine at block 460 sets a lifetime indicator of the affected control item to a low value, for example, 0. Conversely, if the affected control item still exists, the ranking engine at block 462 sets the lifetime indicator of the affected control item to a high value, for example, 1. In the latter case, the ranking engine at block 464 also calculates a scope indicator of the affected control item.

The scope indicator depends on the permissions of the affected control item and/or on the corresponding users, i.e., the users, assigned to the (affected) role or the users whose attributes match the attributes of the (affected) rule (according to information retrieved from the role database and the identity database, through the access control manager). For example, the scope indicator is calculated by applying the following formula:

$$S = \frac{Nu}{TOTu} * \sum_{i=0}^{TOTa} \frac{Np(A_i)}{TOTp(A_i)} * \frac{1}{TOTa}$$

where Nu is the number of users corresponding to the affected role, TOTu is the total number of users, TOTa is the total number of (protected) resources of the information technology system, such as software applications, $Np(A_i)$ is the number of permissions of the affected control item pertaining to the i-th software application, $TOTp(A_i)$ is the total number of permissions pertaining to the i-th software application and S is the value of the score indicator (then ranging from 0 to 1). In this way, the higher the users corresponding to the affected control item and/or the permissions of the affected control item, the higher the scope indicator of the affected control item.

The process then returns to the block 452 to repeat the same operations. With reference again to the block 452, as soon as no more affected control item remains to be processed (always true when the trigger policy has no affected control item since it did not contribute to any revision of the access control information) the process descends into block 466.

At this point, the ranking engine calculates the score of the trigger policy according to the lifetime indicators and the scope indicators of its affected control items. For example, the score is calculated by applying the following formula:

$$W = \sum_{i=0}^{TOTr} L(r_i) * S(r_i) * \frac{1}{TOTr}$$

where TOTr is the total number of the affected control items, $L(r_i)$ is the lifetime indicator of the i-th affected control item, $S(r_i)$ is the scope indicator of the i-th affected control item and W is the score of the trigger policy (then ranging from 0 to 1). In this way, the higher the lifetime indicators and/or the scope indicators of the affected control items the higher the score of the trigger policy.

Alternatively, it is possible to update the score incrementally. For example, for each affected control item the score is decremented when the affected control item does not exist any longer, is incremented when the affected control item still exists, is decremented when the scope indicator is (possible strictly) lower than a (scope) threshold and it is incremented when the scope indicator is (possible strictly) lower than the scope threshold; the decrements and increments are by corresponding delta values, for example, 1-5% of the score and 1-5% of its complement to 1, respectively.

In both cases, the ranking engine at block 468 saves the (new) score of the trigger policy into the corresponding entry of the trigger policy database (by replacing its previous value, initialized manually or to a default value). The ranking engine at block 470 verifies whether a last trigger policy has been processed. If not, the process returns to the block 448 for repeating the same operations on a next trigger policy. Conversely, as soon as all the trigger policies have been processed, the corresponding loop is exit by returning to the block 444 waiting for a next expiration of the ranking period.

As a result, the scores of the trigger polices self-adapt to their effectiveness in triggering the revision of the access control information. Indeed, any revision process, for which one or more relevant trigger policies have contributed to trigger its execution, has involved an update of the access control information; particularly, one or more affected control items may have been created/updated. For each affected control item, if it still exists at a later (ranking) time when the ranking process is performed, this means that its usefulness is likely to be high; conversely, if the affected control item does not exist any longer at the later ranking time, this means that its usefulness is likely to be low. Even more important, if the affected control item has a large scope (for example, defined by a high number of permissions and/or a high number of corresponding users), this means that its usefulness is likely to be high; conversely, if the affected control item has a scarce scope (for example, defined by a low number of permissions and/or a low number of corresponding users), this means that its usefulness is likely to be low. When most affected corresponding are deemed to have a high usefulness, the revision as well is likely to have been useful and then the relevant trigger policies (which have contributed to trigger it) are likely to be very effective; in this case, the scores of the relevant trigger policies are increased so that they will have a higher weight in the next verification processes. Conversely, when most affected corresponding are deemed to have a low usefulness, the revision as well is likely to have been useless and then the relevant trigger policies (which have contributed to trigger it) are likely to be poorly effective; in this case, the scores of the relevant trigger policies are decreased so that they will have a lower weight in the next verification processes.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for facilitating a maintenance of access control information.

However, the access control information may be of any type (for example, based on roles for a RBAC model, rules and attributes for an ABAC model, tables for an Access Control List (ACL) model, and so on) for proving any type of control (for example, enabling/denying every activity, requesting further actions, such as entering a second level password, to enable some activities, and so on).

In an embodiment, the access control information is for controlling access to one or more resources of an information technology system by one or more subjects. However, the information technology system may be of any type (for example, based on a local, wide area, global, cellular or satellite network, exploiting any type of wired and/or wireless connections, with a stand-alone architecture and so on), with any number and type of resources (for example, partial, different or additional resources with respect to the ones mentioned above) whose access has to be controlled by any number and type of subjects (for example, users, programs, services and so on).

In an embodiment, the method includes the following steps executed by a control computing system. However, the control computing system may be of any type (see below) and the steps may be performed at any time (for example, in response to any significant change of the access control information, periodically, upon manual request any combination thereof and so on).

In an embodiment, the method includes retrieving (by the control computing system) one or more trigger policies. However, the trigger policies may be retrieved in any number and in any way (for example, from any memory structure such as a database, a file and the like, via a read/query operation, a local/remote command and so on).

In an embodiment, each trigger policy is based on one or more policy parameters relating to the resources, the subjects and/or the access to the resources by the subjects. However, the trigger policy may be based on any number and type of policy parameters (for example, partial, different or additional policy parameters with respect to the ones mentioned above, providing any macro information relating to the resources, the subjects, the access to the resources by the subjects, any combination thereof and so on)) in any way (for example, via a logic expression, a rule, a statement and so on).

In an embodiment, the method includes retrieving (by the control computing system) the policy parameters. However, the policy parameters may be retrieved in any way (for example, from partial, different or additional policy parameter sources with respect to the ones mentioned above, via read/query operations, local/remote commands and so on).

In an embodiment, the method includes evaluating (by the control computing system) the trigger policies according to the corresponding policy parameters. However, this operation may be performed in any way (for example, by evaluating a logic expression, calculating a formula, applying a rule, exploiting analytics techniques and so on) to determine any value of each trigger policy (for example, a logic value, a discrete level, a numerical value and so on).

In an embodiment, the method includes determining (by the control computing system) a trigger indicator according to a result of said evaluating the trigger policies. However, the trigger indicator may be of any type (for example, a logic value, a discrete value that may take any number of levels, a numerical value and so on) and it may be determined in any way (for example, by calculating any formula based on the values of the trigger policies, applying any thresholding techniques, exploiting cognitive techniques and so on).

In an embodiment, the method includes outputting (by the control computing system) an indication of the trigger indicator. However, the trigger indicator may be output in any way (for example, displayed, transmitted to any person(s), provided to any software application and so on) and in any form (for example, by its value, an explanatory text, an alert or any combination thereof, and so on,).

In an embodiment, a revision of the access control information is triggered in response to the trigger indicator. However, the revision of the access control information may be triggered in any way (for example, suggesting it to any person(s), starting it automatically and so on) according to the trigger indicator in any way (for example, simply indicating that it is needed, providing a corresponding level of priority based on its value, and so on).

In an embodiment, the revision of the access control information includes a mining activity for mapping the subjects to the resources. However, the mining activity may be of any type (for example, role mining, rule mining and so on) and performed in any way (for example, manually, with the aid of automatic tools, such as based on analytics techniques, and so on).

In an embodiment, the revision of the access control information includes a possible update of the access control information based on a result of the mining activity. However, the access control information may be updated in any way (for example, by adding/updating/deleting roles, rules, attributes, identities, access control lists and so on, in any memory structure, such as one or more databases or files, and so on), down to none.

In an embodiment, the method includes performing the mining activity in response to the trigger indicator having a positive value indicative of a need of the revision. However, the positive value of the trigger indicator may be of any type (for example, indicating that the revision is simply needed, that the revision is appropriate, useful or necessary, and so on).

In an embodiment, the method includes updating the access control information according to the result of the mining activity. However, the access control information may be updated in any way according to the result of the mining activity (for example, manually, automatically, accepting proposed updates and so on).

In an embodiment, the access control information includes an indication of one or more roles. However, the roles may be in any number and of any type (for example, executive, manager, developer, accountant and so on).

In an embodiment, each role has one or more permissions to perform one or more activities in the information technology system. However, the permissions/activities may be in any number and of any type (for example, partial, different or additional permissions/activities with respect to the ones mentioned above).

In an embodiment, the access control information includes an indication of one or more of the roles assigned to each of the subjects. However, each subject may be assigned any number of roles.

In an embodiment, the mining activity is a role mining. However, the role mining may be of any type (for example, bottom-up, top-down, by-example, resulting in addition of roles, updating of permissions/assignments of roles, deletion of roles and so on).

In an embodiment, the access control information includes one or more rules. However, the rules may be in any number and of any type (for example, IF/THEN constructs, logic expressions, and so on).

In an embodiment, each rule is based on one or more attributes. However, the attributes may be in any number and of any type (for example, relating to the resources, the subjects, the activities, the context or any combination thereof).

In an embodiment, each rule indicates at least one permission relating to an activity in the information technology system when the rule is satisfied. However, the rule may indicate any number and type of permissions (see above) relating to the activities in any way (for example, enabling, denying and so on).

In an embodiment, the mining activity is a rule mining. However, the rule mining may be of any type (for example, bottom-up, top-down, by-example, resulting in addition/ updating/deletion of rules, change of attributes and so on)

In an embodiment, the method includes determining (by the control computing system) the trigger indicator according to corresponding scores assigned to the trigger policies. However, the scores may be of any type (for example, discrete/continuous weights, flags, fixed/variable and so on) and they may be used to determine the trigger indicator in any way (for example, by weighting the values of the trigger policies, enabling/disabling their consideration and so on); in any case, this feature may also be omitted in a simplified implementation.

In an embodiment, the method includes storing (by the control computing system) historical information indicative of the revision. However, the historical information may be of any type (for example, all the changes applied to the access control information or only part thereof, such as partial, different or additional pieces of information with respect to the ones mentioned above) and stored in any way (for example, in any memory structure such as a database, a file and so on).

In an embodiment, the historical information indicates the revision in association with relevant one or more of the trigger policies contributing to trigger the revision. However, the relevant trigger policies may be in any number and defined in any way (for example, all the trigger policies evaluated to true, the trigger policies evaluated to true and with the scores higher than a threshold, a pre-defined number of the trigger policies evaluated to true and having the highest scores, and so on).

In an embodiment, the method includes updating (by the control computing system) the scores of the relevant trigger polices. However, the scores may be updated in any way (for example, by re-calculating, increasing/decreasing by delta values and so on) according to any source(s) of information (for example, the historical information, the access control information, the policy information parameters, any combination thereof, and so on).

In an embodiment, the scores of the relevant trigger policies are updated according to the historical information and the access control information at a ranking time following the revision. However, the scores may be updated in any way according to the historical information (for example, with reference to the last revision only, to one or more revisions possibly weighted according to their age and so on) and to the access control information (for example, according to their context, a comparison with the historical information, and so on) at any ranking time (for example, with a pre-defined delay, continually according to a pre-defined period and so on).

In an embodiment, the method includes storing (by the control computing system) the historical information comprising an indication of one or more affected control items contributing to define the access control information being affected by the revision. However, the affected control items may be in any number and of any type (for example, role, rules, all the created/updated ones, only the created ones and so on).

In an embodiment, the method includes updating (by the control computing system) the scores of the relevant trigger policies according to the affected control items at the ranking time. However, the scores may be updated according to the affected control items in any way (for example, according to their lifetimes, scopes, or any combination thereof, and so on).

In an embodiment, the method includes retrieving (by the control computing system) corresponding lifetime indicators of the affected control items at the ranking time. However, the lifetime indicators may be of any type (for example, simply indicating whether the affected control items still exist or not, measuring the time elapsed from their creation or last modification, and so on).

In an embodiment, the method includes updating (by the control computing system) the scores of the relevant trigger policies according to the lifetime indicators of the affected control items. However, the scores may be updated in any way according to the lifetime indicators (for example, using them in any linear/non-linear way to calculate the scores, increasing/decreasing the scores by a fixed value or by a value proportional thereto, and so on).

In an embodiment, the method includes retrieving (by the control computing system) corresponding scope indicators of the affected control items at the ranking time. However, the scope indicators may be of any type (for example, based on the users corresponding to the affected control items, the permissions of the affected control items, or any combination thereof, and so on).

In an embodiment, the method includes updating (by the control computing system) the scores of the relevant trigger policies according to the scope indicators of the affected control items. However, the scores may be updated in any way according to the scope indicators (for example, using them in any linear/non-linear way to calculate the scores, increasing/decreasing the scores by a fixed value or by a value proportional thereto when they are below/above any threshold, and so on).

In an embodiment, the scope indicator of each of the affected control items is based on the subjects corresponding to the affected control item. However, the scope indicator may be based in any way on the subjects corresponding to the affected control item (for example, on the subjects assigned to the affected role, the subjects whose attributes match the ones of the affected rule, their number, their number calculated by weighing the subjects according to their type, and so on).

In an embodiment, the scope indicator of each of the affected control items is based on permissions of the affected control items to perform activities in the information technology system. However, the scope indicator may be based in any way on the permissions of the affected control item (for example, on their number in general, their number with respect to each resource, possibly weighed according to the type of the resource, and so on).

In an embodiment, conditioned one or more of the trigger policies comprise an indication of one or more evaluation conditions. However, the conditioned trigger policies may be in any number (down to zero), each comprising any number and type of evaluation conditions (for example, requesting the completion of a task, the occurrence of an event, either depending or not on any logic expression, and so on).

In an embodiment, the method includes conditioning (by the control computing system) said evaluating each of the conditioned trigger policies on the corresponding evaluation conditions. However, the evaluation of each conditioned trigger policy may be conditioned in any way (for example, waiting for the completion of a conditioning task, waiting for the occurrence of an event, with or without a corresponding time-out, and so on).

In an embodiment, at least one of the evaluation conditions is a completion of a corresponding conditioning task. However, the conditioning task may be of any type (for example, partial, different or additional conditioning tasks with respect to the ones mentioned above).

In an embodiment, the method includes determining (by a control computing system) a significant change of the policy parameters. However, the significant change may be defined in any way (for example, with reference to any number of policy parameters that have changed, either in absolute or relative terms) and determined in any way (for example, by monitoring the policy parameters, by receiving corresponding notifications and so on).

In an embodiment, the method includes performing (by the control computing system) a verification process (comprising said retrieving the trigger polices, retrieving the policy parameters, evaluating the trigger policies, determining the trigger indicator and outputting the indication of the trigger indicator) in response to the significant change of the policy parameters. However, the verification process may be performed in any way in response to the significant change of the policy parameters (for example, automatically, requiring a manual confirmation and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program which is configured for causing a control computing system to perform the above-mentioned method. An embodiment provides a computer program product for facilitating a control of access to an information technology system by one or more subjects. The computer program product includes a computer readable storage medium that has program instructions embodied therewith. The program instructions are executable by a control computing system to cause the control computing system to perform the above-mentioned method. However, the software program may be implemented as a stand-alone module, as a plug-in for a preexisting software program (for example, the access control manager), or even directly in the latter; it would be readily apparent that it is also possible to deploy the same solution as a service that is accessed via the network (such as in the Internet). Moreover, the programs may be executed on any control computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a control computing system comprising means that are configured for performing the steps of the above-described method. An embodiment provides a control computing system comprising a circuit (i.e., any hardware suitably configured, for example, by software)

for performing each of the steps of the same method. However, the control computing system may be of any type (for example, one or more physical/virtual machines, a static or dynamic combination thereof, such as in a cloud computing environment, either the same as or different from the one used to control the access to the information technology system, and so on).

Generally, similar considerations apply if the control computing system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
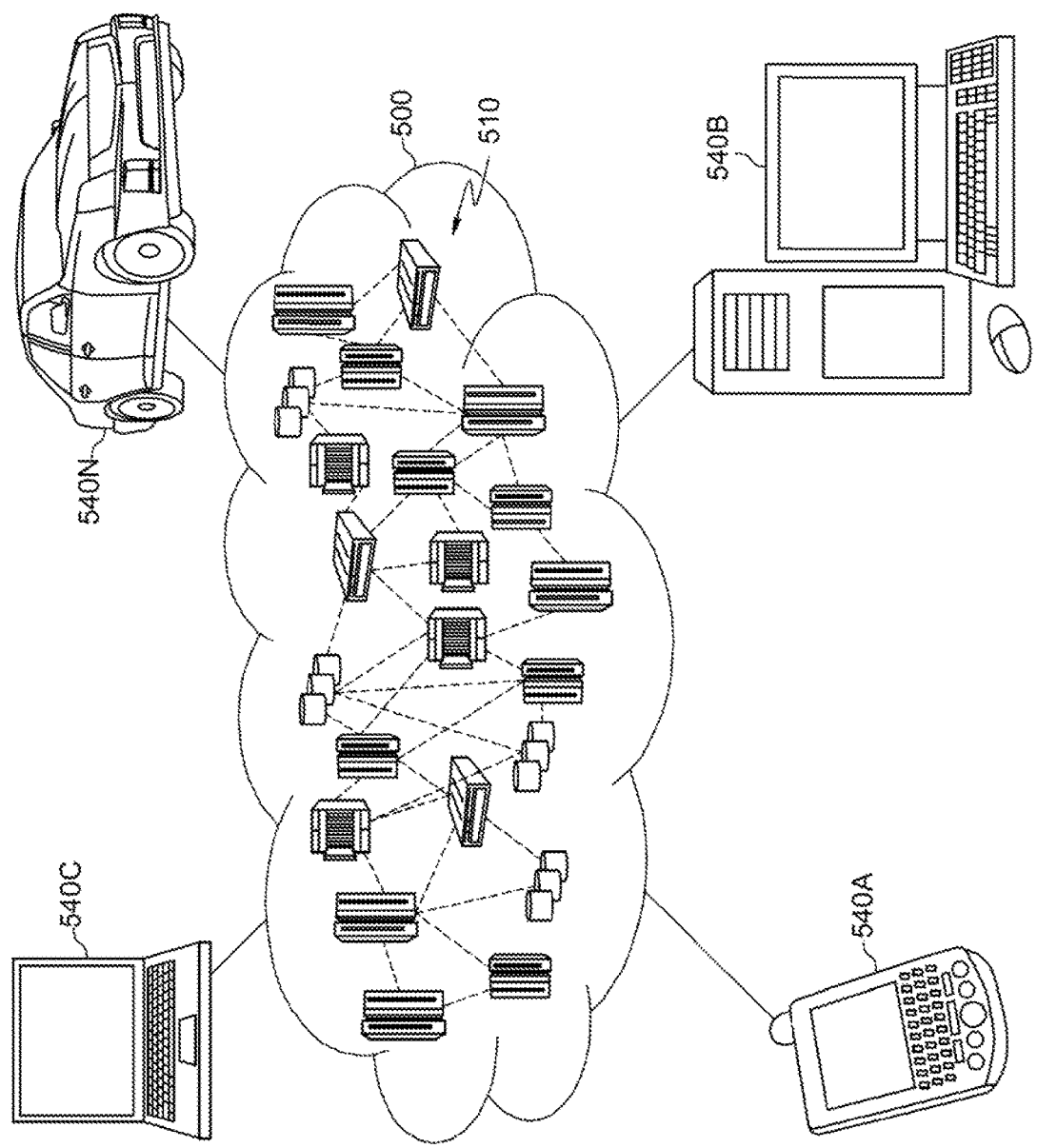
FIG. 5 depicts a cloud computing environment according to an embodiment of the present invention.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
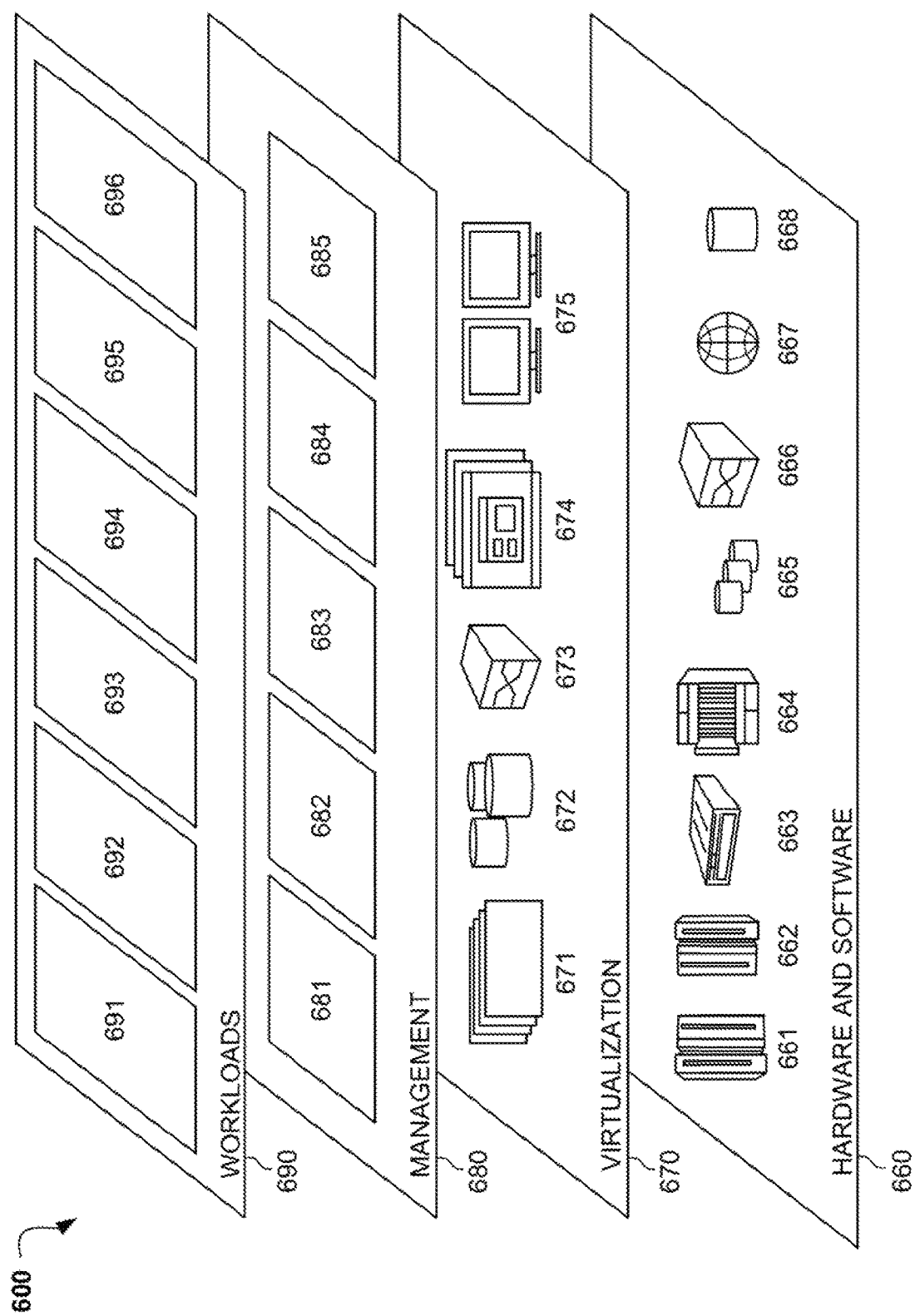
FIG. 6 depicts abstraction model layers according to an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 106 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and control access 696. The control access 696 may manage access control of an information technology system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for facilitating a maintenance of access control information for controlling access to one or more resources of an information technology system by one or more subjects, wherein the method comprises:

retrieving, by a control computing system, one or more trigger policies each based on one or more policy parameters relating to the resources, the subjects and the access to the resources by the subjects, wherein each of the one or more trigger policies identifies a condition for a revision of the access control information relating to the one or more resources of the information technology system, to the one or more subjects and the access to the one or more resources of the information technology, wherein each of the one or more trigger policies is evaluated by determining whether it is true and is based on one or more policy parameters;

retrieving, by the control computing system, the policy parameters, wherein the policy parameters comprise a change of greater than a threshold number of new users, a change of greater than a second threshold number of new users in a department, a change of greater than a third threshold number of changes in an organization chart, greater than a fourth threshold number of new roles of the subjects since a last evaluation of the one or more trigger policies;

evaluating, by the control computing system, the trigger policies according to the corresponding policy parameters;

determining, by the control computing system, a trigger indicator according to a result of said evaluating the trigger policies, wherein the trigger indicator is a trigger index calculated by weighing the trigger policies that are true according to their corresponding scores associated with their effectiveness in triggering the revision of the access control information;

outputting, by the control computing system, an indication of the trigger indicator to trigger a revision of the access control information in response to the trigger indictor, the revision comprising a mining activity for mapping the subjects to the resources and an update of the access control information caused by a result of the mining activity; and revising the access control information, by an access control manager, based on the outputting.

2. The method according to claim 1, further comprising: performing the mining activity in response to the trigger indicator having a positive value indicative of a need of the revision.

3. The method according to claim 2, further comprising: updating the access control information according to the result of the mining activity.

4. The method according to claim 2, wherein the access control information comprises an indication of one or more roles each having one or more permissions to perform one or more activities in the information technology system and an indication of one or more of the roles assigned to each of the subjects, the mining activity being a role mining.

5. The method according to claim 2, wherein the access control information comprises one or more rules each based on one or more attributes and indicating at least one permission relating to an activity in the information technology system when the rule is satisfied, the mining activity being a rule mining.

6. The method according to claim 1, further comprising: determining, by the control computing system, the trigger indicator according to corresponding scores assigned to the trigger policies.

7. The method according to claim 6, further comprising: storing, by the control computing system, historical information indicative of the revision in association with relevant one or more of the trigger policies contributing to trigger the revision; and updating, by the control computing system, the scores of the relevant trigger policies according to the historical information and the access control information at a ranking time following the revision.

8. The method according to claim 7, further comprising: storing, by the control computing system, the historical information comprising an indication of one or more affected control items at the ranking time; and updating, by the control computing system, the scores of the relevant trigger policies according to the affected control items at the ranking time.

9. The method according to claim 8, further comprising: retrieving, by the control computing system, corresponding lifetime indicators of the affected control items at the ranking time; and updating, by the control computing system, the scores of the relevant trigger policies according to the lifetime indicators of the affected control items.

10. The method according to claim 8, further comprising: retrieving, by the control computing system, corresponding scope indicators of the affected control items at the ranking time; and updating, by the control computing system, the scores of the relevant trigger policies according to the scope indicators of the affected control items.

11. The method according to claim 10, wherein the scope indicator of each of the affected control items is based on the subjects corresponding to the affected control items.

12. The method according to claim 10, wherein the scope indicator of each of the affected control items is based on permissions of the affected control items to perform activities in the information technology system.

13. The method according to claim 1, wherein conditioned one or more of the trigger policies comprise an indication of one or more evaluation conditions, and the method further comprising conditioning, by the control computing system, said evaluating each of the conditioned trigger policies on the corresponding evaluation conditions.

14. The method according to claim 13, wherein at least one of the evaluation conditions is a completion of a corresponding conditioning task.

15. The method according to claim 1, further comprising: determining, by the control computing system, a significant change of the policy parameter; and performing, by the control computing system, a verification process, comprising said retrieving the trigger polices, retrieving the policy parameters, evaluating the trigger policies, determining the trigger indicator and outputting the indication of the trigger indicator, in response to the significant change of the policy parameters.

16. A computer program product for facilitating a maintenance of access control information for controlling access to one or more resources of an information technology system by one or more subjects, the computer program product comprising:

one or more computer-readable tangible storage medium and program instructions stored on at least one of the one or more tangible storage medium, the program instructions executable by a processor device, the program instructions comprising:

program instructions to retrieve one or more trigger policies each based on one or more policy parameters relating to the resources, the subjects and the access to the resources by the subjects;

wherein each of the one or more trigger policies identifies a condition for a revision of the access control information relating to the one or more resources of the information technology system, to the one or more subjects and the access to the one or more resources of the information technology, wherein each of the one or more trigger policies is evaluated by determining whether it is true and is based on one or more policy parameters;

program instructions to retrieve the policy parameters, wherein the policy parameters comprise a change of greater than a threshold number of new users, a change of greater than a second threshold number of new users in a department, a change of greater than a third threshold number of changes in an organization chart, greater than a fourth threshold number of new roles of the subjects since a last evaluation of the one or more trigger policies;

program instructions to retrieve evaluate the trigger policies according to the corresponding policy parameters;

program instructions to determine a trigger indicator according to a result of evaluating the trigger policies, wherein the trigger indicator is a trigger index calculated by weighing the trigger policies that are true according to their corresponding scores associated with their effectiveness in triggering the revision of the access control information;

program instructions to output an indication of the trigger indicator to trigger a revision of the access control information in response to the trigger indicator, the revision comprising a mining activity for mapping the subjects to the resources and an update of the access control information based on a result of the mining activity; and revising the access control information, by an access control manager, based on the outputting.

17. The computer program product according to claim 16, further comprising:

program instructions to perform the mining activity in response to the trigger indicator having a positive value indicative of a need of the revision.

18. The computer program product according to claim 17, further comprising:

program instructions to update the access control information according to the result of the mining activity.

19. The computer program product according to claim 17, wherein the access control information comprises an indication of one or more roles each having one or more permissions to perform one or more activities in the information technology system and an indication of one or more of the roles assigned to each of the subjects, the mining activity being a role mining.

20. The computer program product according to claim 17, wherein the access control information comprises one or more rules each based on one or more attributes and indicating at least one permission relating to an activity in the information technology system when the rule is satisfied, the mining activity being a rule mining.

* * * * *